United States Patent

Suzuki et al.

[11] Patent Number: 5,443,605
[45] Date of Patent: Aug. 22, 1995

[54] POLYCRYSTALLINE CUBIC BORON NITRIDE ABRASIVE

[75] Inventors: Masaharu Suzuki, Kawasaki; Tomoki Nikaido, Tokyo; Takeshi Mabuchi, Machida, all of Japan

[73] Assignee: Denki Kagaku Kogyo Kabushiki Kaisha, Tokyo, Japan

[21] Appl. No.: 253,196

[22] Filed: Jun. 1, 1994

Related U.S. Application Data

[63] Continuation of Ser. No. 53,093, Apr. 26, 1993, abandoned.

[30] Foreign Application Priority Data

Apr. 30, 1992 [JP] Japan .................................. 4-135593

[51] Int. Cl.⁶ ............................................. C09C 1/68

[52] U.S. Cl. ...................................... 51/307; 423/290; 501/96

[58] Field of Search .......................... 51/307; 423/290; 501/96

[56] References Cited

U.S. PATENT DOCUMENTS

| | | | |
|---|---|---|---|
| 4,016,244 | 4/1977 | Susa et al. | 423/290 |
| 4,289,503 | 9/1981 | Corrigan | 51/307 |
| 4,551,316 | 11/1985 | Iizuka | 423/290 |
| 4,859,531 | 8/1989 | Tsuji et al. | 264/332 |

Primary Examiner—Deborah Jones
Attorney, Agent, or Firm—Darby & Darby

[57] ABSTRACT

A polycrystalline cubic boron nitride abrasive is provided wherein a mean size of each primary crystal grain forming the abrasive is not more than 1.0 μm and a standard deviation thereof is not more than 0.5.

2 Claims, 1 Drawing Sheet

POLYCRYSTALLINE CUBIC BORON NITRIDE ABRASIVE

This is a continuation of application Ser. No. 08/053,093, filed Apr. 26, 1993, now abandoned.

BACKGROUND OF THE INVENTION

This invention relates to a polycrystalline cubic boron nitride (cBN) abrasive. Among the grinding wheels, to which the abrasive of the present invention is applied, there are, above all, a metal bonded grinding wheel, an electroplated grinding wheel and a vitrified grinding wheel for heavy loaded or high-speed grinding.

Since cBN, which is a high-pressure phase of boron nitride, has a hardness and a thermal conductivity next to diamond, and a characteristic of not being reacted with iron-based metal which is absent in diamond, it is being exploited as an abrasive for grinding the iron-based metal. The recent tendency of the grinding operation is towards labor saving and unmanned operation. To this end, heavy loaded grinding and high-speed grinding are carried out. However, under hostile grinding conditions imposed in this manner, a large load is applied to the grinding wheel, above all, on the abrasives, so that higher strength is required of the abrasive.

Among the high-strength cBN abrasives, an abrasive having a polycrystalline structure is known, which partially has been commercialized. The polycrystalline abrasive has a polycrystalline structure in which fine crystal grains are strongly bonded to one another, so that it is tough, and hence exhibits a high strength, in contrast to a monocrystalline abrasive in which one single grain is constituted by a monocrystal. The polycrystalline abrasive is produced by pulverizing a sintered body obtained by a non-catalytic direct conversion method to a desired grain size, thus in a manner different from the catalytically synthesized monocrystalline abrasive, as disclosed in U.S. Pat. No. 4,289,503. Although the polycrystalline abrasive is tougher than a monocrystalline abrasive, if the abrasives are used for a grinding wheel under hostile conditions including heavy loaded or high-speed grinding, abrasives on the surface of the grinding wheel are partially destroyed or worn out to present a coarse work surface or to lower the cutting performance, so that dressing or tooling operations need to be carried out frequently.

SUMMARY OF THE INVENTION

It is an object of the present invention to provide an abrasive exhibiting superior wear resistant properties and high strength capable of withstanding hostile operating conditions including heavy loaded grinding and high-speed grinding.

The above and other objects of the present invention will become apparent from the following description.

According to the present invention, there is provided a polycrystalline cubic boron nitride abrasive wherein a mean size of each primary crystal grain forming the abrasive is not more than 1.0 $\mu$m and a standard deviation thereof is not more than 0.5.

DETAILED DESCRIPTION OF THE PREFERRED EMBODIMENTS

Figure 1:
FIG. 1 is a photograph of a dark field image taken with a transmission electron microscope having a magnification factor of 8,000, for illustrating a grain structure of a primary crystal grain of a polycrystalline cBN prepared in Example 1.

The present invention will be explained in detail hereinbelow.

According to the present invention, the mean size of each primary crystal grain forming the cBN abrasive should be 1.0 $\mu$m or smaller. If the mean size of the primary crystal grain exceeds 1.0 $\mu$m, the resulting sintered body is lowered in toughness, while a grinding tool employing the abrasives is lowered significantly in wear resistant properties. The reason why the standard deviation of the grain size is set so as to be not more than 0.5 is that the standard deviation of the size of the primary crystal grain exceeding 0.5 leads to lower strength and susceptibility to destruction by reason of non-uniformity induced in the fine structure. The mean size of the primary crystal grain forming the cBN abrasive according to the present invention denotes a mean size of each cBN crystal grain constituting the polycrystalline abrasive. The above mentioned mean size of the primary crystal grain may be differently termed a mean primary crystallite size of the abrasive. Although not critical, the lower limit of the mean size of each primary crystal grain is generally on the order of 0.4 $\mu$m. Although similarly not critical, the lower limit value of the standard deviation is generally on the order of 0.2.

The above range for the mean size of each primary crystal grain is defined on the basis of a finding that the size of each primary crystal grain forming the polycrystalline abrasive significantly influences the strength and wear resistant properties of the abrasive as discussed in (1) to (4) below:

(1) Heavy loaded grinding was actually carried out using a variety of grinding wheels having different abrasives made up of the primary crystal grains of different sizes, and the states of the individual abrasives protruded on the surfaces of the grinding wheels were observed before and after grinding. It was found in this manner that the abrasives having a mean size of each primary crystal grain exceeding 1 $\mu$m was selectively worn out on its surface to a larger extent, whereas the abrasives each having sporadic sizes of the primary crystal grains underwent a large breakdown without being operated as grinding points during grinding.

(2) The grinding wheel having only abrasives in which the size of each primary crystal grain is lower than a predetermined value and is relatively uniform is not susceptible to attrition or a larger breakdown of the abrasives, as mentioned hereinabove, thus significantly protracting the service life of the grinding wheel.

(3) As described in detail in the Examples to follow, the commercial polycrystalline cBN abrasive has a mean size of each primary crystal grain constituting the abrasive and a standard deviation thereof of 2.3 $\mu$m and 0.9, respectively, such that the grinding wheel directly employing the abrasives is severely worn out so that the work cut with the grinding wheel presents only a rough ground surface. Conversely, the grinding wheel employing abrasives specified in accordance with the present invention experiences extremely small attrition while roughness noticed on the work surface is also decreased significantly.

(4) If the direct transformation method, among the methods for synthesis of the cBN polycrystals, is employed, and suitable conditions for synthesis are selected, an abrasive having a constant size of the cBN primary crystal grains forming the abrasive and a uniform fine structure may be produced.

For measuring the mean size of the primary crystal grains forming the cBN abrasive, any of the following methods (1) to (4) may be employed. It is noted that since analysis is to be made of an extremely small area with any of these methods, it is preferred to make measurements at plural sites to permit the structure of the abrasive to be analyzed more uniformly its entirety.

(1) The abrasive is cut to form a thin lamina and, using a transmission electron microscope, a dark field image having a contrast corresponding to the size of the primary crystal grains is produced by image formation using only particular diffraction lines, and analysis is made of a photograph thereof having a large number of images of the primary crystal grains.

(2) An abrasive is fractured and the structure of a fractured surface on the grain boundary is directly observed using a scanning atomic force microscope. A photograph is taken and subjected to image analysis for measurement.

(3) The surface of an abrasive is etched with thermally fused sodium carbonate and a grain boundary region thereof is selectively etched to form surface irregularities and the size of these surface irregularities is measured using a surface roughness tester to measure the mean size and the standard deviation of the primary crystal grains.

The reason why the mean size and the standard deviation as statistic values are used in the present invention for specifying the size of the primary crystal grains is that since the polycrystalline abrasives are each formed by a large number of the primary crystal grains, it becomes necessary to use the statistic values for defining the average qualities of each abrasive in its entirety. On the other hand, since there may be deviation among the different abrasives, a sampling method by increment reduction becomes critical for accurately interpreting the qualities of the abrasives in its entirety. It is recommendable to use the sampling method specified in JIS R 6003 "Methods for Sampling of Abrasive Grains".

The grinding wheel in which the abrasive employed has a mean size of each primary crystal grain of not more than 1 μm and a boron/nitrogen (B/N) molar ratio of not lower than 0.95 and less than 1.00 is particularly preferred because the grinding wheel is subject to wear to a lesser extent and the initial grinding performance may be maintained for an extended period of time.

The following accounts for the B/N molar ratio in the polycrystalline cBN of not lower than 0.95 and less than 1.00 being preferred in the present invention. If grinding wheels are produced using the polycrystalline cBN abrasives having variable values of the B/N molar ratios, and changes in the shape of the abrasives during grinding are observed in detail using a metalloscope and a scanning microscope, the abrasive having a B/N molar ratio of not less than 1 undergoes considerable wear and breakdown at the tip end of the grain with the progress of grinding, so that the abrasive is changed in shape significantly. More detailed observation of the fractured portion has revealed that the abrasive was broken down severely because of tearing off of a large number of cBN grains in addition to the in-grain breakdown. While the abrasive is worn out severely in a similar manner with the B/N molar ratio of less than 0.95, it has been found that the breakdown within the constituent cBN grains is mainly responsible for the breakdown in the abrasive. Conversely, in the case of the polycrystalline cBN abrasive having a B/N ratio of not less than 0.95 and less than 1.00, attrition of the abrasive is reduced to a markedly lesser extent because of significantly reduced attrition and tearing off of the cBN grains constituting the grinding wheel and hence the grinding wheel exhibits a superior grinding performance.

The following method may be employed for measuring the B/N molar ratio of polycrystalline cBN. The nitrogen content in polycrystalline cBN may be determined by dissolving and decomposing polycrystalline cBN in an impulse furnace in an inert gas atmosphere and analyzing the composition of the evolved nitrogen gas. On the other hand, the boron content may be determined by analyzing, by an alkali neutralization titration method, a sample obtained by extraction with a methanol extraction method from a solution in hydrochloric acid of polycrystalline cBN previously mixed with alkali and melted by heating.

The polycrystalline cBN abrasive according to the present invention may be prepared by the following illustrative method. The polycrystalline cBN abrasive may be prepared by pulverizing a sintered body obtained by a non-catalytic direct transformation method to a desired grain size, as stated hereinabove. The sintered body obtained by the direct transformation method, may be synthesized by processing pyrolytic boron nitride within a range of higher temperatures and pressures representing a stable region for cBN as disclosed in U.S. Pat. No. 4,188,194.

According to the present invention, the starting materials, the reaction chamber in which the higher temperatures and higher pressures are generated, the temperature to be maintained and the reaction time duration are rigorously controlled as described hereinbelow for producing a cBN sintered body having controlled purity, primary crystal grain size and B/N ratio.

First, the starting materials and the reaction chamber of high purity need to be employed. The reason is that if any foreign matter is present in the sintered body during cBN synthesis, abnormal grain growth is induced at the site of the foreign matter, or a sintered body of a homogeneous structure cannot be produced. Consequently, high purity low pressure phase boron nitride, such as pyrolytic boron nitride, needs to be employed as the starting material. The low pressure phase boron nitride preferably has a purity of not less than 99%. The low pressure phase boron nitride which may be employed in the present invention means a substance having a crystal structure in which planar fused hexagons each constituted by alternate bonding of boron and nitrogen atoms are stacked together. Examples of the low pressure phase boron nitride include hexagonal boron nitride (hBN), boron nitride of turbostratic layered structure (tBN), boron nitride of rhombohedral (rBN), or mixtures thereof.

On the other hand, the polycrystalline cBN having the above-specified B/N molar ratio may be prepared by the following method. The low pressure phase boron nitride employed as a starting material is preferably adjusted to have a B/N molar ratio of not less than 0.900 and not more than 0.970, because the boron content becomes excessive due to dissipation of nitrogen as a volatile component resulting from cBN decomposition incurred during cBN synthesis. The starting material is sealed within a reaction chamber in a nitrogen atmosphere, after having been allowed to stand at 200° C. for six hours in a nitrogen atmosphere without being exposed to air.

The reaction chamber needs to be of higher purity and insusceptible to reaction with cBN to inhibit pollution in the course of the high temperature high pressure reaction process. It is specifically preferred to use a semiconductor grade high purity carbon of 99.9 wt% purity or higher as a heater and to accommodate a sleeve formed by a molded body of high purity NaCl powders in the heater. It is also preferred to accommodate a low pressure phase boron nitride starting material wrapped in a metal foil such as a foil of tantalum (Ta) within the sleeve. With such construction of the reaction chamber, tantalum acts as a getter for capturing the foreign matter, so that the foreign matter may be prevented by the Ta foil from being dispersed from the carbon heater or from outside the carbon heater. Since NaCl has only low electrical conductivity, it may be provided as a sleeve between the carbon and Ta as an electrically conductive material for assuring stable heating without the risk of possible contact between Ta and carbon.

The high temperature and the high pressure to be maintained and the time duration of maintenance of the high temperature and pressure are critical because these factors significantly influence the purity of the sintered body to be produced and the size of the primary crystal grain. In order to produce the abrasive having the mean size of not larger than 1.0 $\mu$m and a standard deviation of not more than 0.5 of the primary crystal grain, the temperature and the pressure should be those under which cBN remains stable thermodynamically and, in addition the temperature should be not lower than 1900° C. and not higher than 2100° C. The reason is that if the temperature is lower than 1900° C., the low pressure phase boron nitride starting material is not converted completely into cBN, such that the sintered body with the purity exceeding 99 wt% cannot be obtained, whereas if the temperature exceeds 2100° C., a part of the primary crystal grain becomes coarse to render the structure non-uniform, possibly because of initiated grain growth, such that the standard deviation of the size of the primary crystal grains exceeds 0.5. Above all, if the temperature exceeds 2200° C., the mean size of the primary crystal grains exceeds 1.0 $\mu$m, possibly because of the progress in the growth of crystal grains.

The holding time of the above conditions is preferably not longer than 120 minutes. If the holding time exceeds 120 minutes, sintering of the primary crystal grains not larger than 1.0 $\mu$m, once formed, proceeds to incur grain growth to render the size of the primary crystal grain coarse or non-uniform.

It is understood that the following accounts for an increased strength and superior wear resistant properties of the polycrystalline cBN abrasive in which the mean size of the primary crystal grains constituting the abrasive and the standard deviation thereof are not more than 1.0 $\mu$m and not more than 0.5, respectively.

During grinding, a large impulsive shearing force is applied to the abrasives. That is, if primary crystal grains constituting the polycrystalline cBN abrasive are of a finer grain size and of uniform fine structure, such that the mean size of the primary crystal grains is not more than 1.0 $\mu$m and the standard deviation thereof is not more than 0.5, the grain is less friable because of its increased toughness and increased resistance against crack propagation. Conversely, if the primary crystal grains are of non-uniform size, stress concentration is likely to be incurred in the non-uniform grain size portion on application of an external pressure, thus leading to lowered strength of the grains and grain breakdown during grinding.

Besides, the following possibly accounts for the low attrition rate of the abrasive according to the present invention. The attrition at the tip end of the abrasive is thought to be incurred by the tearing off of the primary crystal grains under an impulsive shearing force. It is understood that the amount of the grains torn off during one grinding operation with the abrasive of the present invention is small because the mean size of the primary crystal grains constituting the abrasive is as small as 1.0 $\mu$m or less, thus leading to a lower rate of attrition.

On the other hand, the following possibly accounts for the lowered attrition of the grinding wheel and maintenance of the initial grinding performance over an extended period of time in case of using the polycrystalline cBN abrasive having the B/N molar ratio of not less than 0.95 and less than 1.00. Nitrogen tends to become dissipated when liberated readily as compared with boron, so that impure compounds are more likely to be formed when boron exists in excess, such that the lowering of the strength of the abrasive becomes outstanding when the B/N molar ratio exceeds 1.00. Another possible factor leading to deviation of the B/N molar ratio from 1.00 is the defects in the cBN grain. It may be surmised that a large deviation of the B/N molar ratio from the above range with increase in the defects leads to lowered strength of the cBN grain itself. The present invention consists in providing the abrasive of high strength and long service life by preventing the strength of the abrasive from being lowered in connection with both the impure compounds and the defects.

EXAMPLES OF THE INVENTION

The present invention will be explained in detail with reference to Examples and Comparative Examples.

Comparative Example 1

The sole commercial polycrystalline cBN abrasive "BORAZON BZ550" having a grain size of 60/80 mesh manufactured and sold by GENERAL ELECTRIC COMPANY, was obtained and sampled in accordance with the method prescribed in JIS R 6003. With the aid of a transmission electron microscope, an image was formed, using only a portion of (111) lines of diffraction. A dark field image having a contrast corresponding to the size of the primary crystal grains was produced.

By analyzing the photograph of the produced dark field image containing a large number of images of primary crystal grains with the aid of an image analyzer "LA555" manufactured by PIAS CO. LTD., the mean size and the standard deviation of the size of the primary crystal grains constituting the abrasive were measured. It is noted that the measurement was conducted at arbitrarily selected ten fields of view in order to permit the entire abrasive to be interpreted on an average. The results are shown in Table 1.

On the other hand, 1.2 g of the abrasives were mixed with an alkali and fused by heating. The fused product was allowed to be coalesced at ambient temperature and dissolved by addition of hydrochloric acid. A sample was extracted from the resulting solution using a methanol distillation method. The extracted solution was titrated with an alkali to carry out weight analysis of boron contained in the abrasive. On the other hand, 1.2 g of the abrasive was dissolved and decomposed under an inert gas atmosphere in an impulse furnace and a nitrogen gas evolved was analyzed for a nitrogen content in the abrasive using gas chromatography. The result of the analysis indicated a B/N molar ratio of the polycrystalline cBN abrasive of 1.03.

200 carats of the cBN crystal grain were extracted to prepare a vitrified bonded grinding wheel having a diameter of 200 mm, a thickness of 10 mm and a degree of concentration of 200. A grinding test was carried out, using the grinding wheel, by a flat plunge-cut machinig method, and the amount of attrition of the grinding wheel and the surface roughness of the ground test pieces were measured. The results are shown in Table 1.

Meanwhile, the test pieces used for the grinding test were pieces of bearing steel SUJ2, and the grinding conditions were such that the circumferential speed of the grinding wheel was 3600 m/min, the feed rate of the test pieces was 9 m/min, the depth of cut of the grinding wheel was 15 μm and the grinding time was 60 min.

Examples 1 to 5 and Comparative Examples 2 to 4

Using pyrolytic boron nitride having a B/N molar ratio of 0.98 and various purities ranging from 98.0 to 99.9 wt%, as a starting material, and using semiconductor grade high purity carbon with a purity of not less than 99.9 wt% as a heater, a reaction cell was constructed in which a sleeve formed of a molded body of high purity NaCl powders was placed within the heater and a piece of a pyrolytic boron nitride starting material wrapped in a tantalum foil, was accommodated in the sleeve. In assembling the reaction cell, the piece of the starting material was allowed to stand in a nitrogen atmosphere at 200° C. for six hours and subsequently sealed in a reaction chamber under a nitrogen atmosphere without being exposed to air. The reaction cell was loaded in a flat belt type ultra-high pressure and high temperature generator and processed at a temperature shown in Table 1 and a pressure of 8.0 GPa for 100 minutes to synthesize each of directly converted cBN polycrystalline products, which were then recovered. Each of the polycrystalline products thus recovered was crushed with a roll crusher and classified for sorting out the abrasives having a 60 to 80 mesh grain size. The abrasives were sampled in accordance with the method of JIS R6003 and a dark field image having a contrast corresponding to the size of the primary crystal grains was produced, using only a fraction of the (111) diffraction lines, with the aid of a transmission electron microscope.

By analyzing each photograph of the produced dark field images containing a large number of images of primary crystal grains with the aid of an image analyzer "LA555" manufactured by PIAS CO., LTD., the mean size and the standard deviation of the size of the primary crystal grains constituting the sintered body were measured. It is noted that measurement was conducted at arbitrarily selected ten fields of view in order to permit the entire abrasive to be interpreted on an average. The mean sizes of the primary crystal grains constituting the abrasives and standard deviations as obtained by image analyses, are shown in Table 1. The dark field image by a transmission electron microscope, with a magnification factor of 8,000, showing the construction of the primary crystal grains of the cBN abrasive produced by Example 1, is shown in FIG. 1.

The B/N molar ratio of each of the abrasives, produced in accordance with Examples 1 to 5 and Comparative Examples 2 to 4, was measured in the same way as for Comparative Example 1.

Using the abrasives obtained in accordance with the Examples 1 to 5 and Comparative Examples 2 to 4, grinding wheels were prepared by the same method as explained in connection with Comparative Example 1, and the grinding performance thereof was measured under the same conditions. The results are shown in Table 1.

Examples 6 to 9

The directly converted cBN polycrystalline products were synthesized under the same conditions as in the above Examples, except using as a starting material pyrolytic boron nitride having a purity of 99.9 wt% with a variety of different values of the B/N molar ratio ranging from 0.93 to 1.01. Each of the synthesized polycrystalline products was pulverized to produce abrasives. The mean size and the standard deviation of the primary crystal grains constituting the abrasive as well as the B/N molar ratio of the abrasive were measured of the produced abrasives in the same way as in Example 1.

Then, using the abrasives obtained in Examples 6 to 9, grinding wheels were produced in the same way as in Comparative Example 1, and the grinding performance thereof was measured under the same conditions as in Comparative Example 1. The results are shown in Table 1.

TABLE 1

| | | Conditions of Synthesis | | Size of Primary Crystal Grains of Abrasive | | B/N Molar Ratio | | Results of Grinding | |
|---|---|---|---|---|---|---|---|---|---|
| | | Temperature (°C.) | Purity of Starting Material (%) | Mean Size μm | Standard Deviation | Starting Material | cBN | Attrition of Grinding Wheel μm | Surface Roughness Ra μm |
| Ex. | 1 | 1950 | 99.9 | 0.7 | 0.4 | 0.98 | 1.00 | 6 | 1 |
| | 2 | 2000 | 99.9 | 0.8 | 0.4 | 0.98 | 1.00 | 6 | 2 |
| | 3 | 2000 | 99.2 | 1.0 | 0.5 | 0.98 | 1.00 | 8 | 1 |
| | 4 | 1960 | 99.3 | 0.8 | 0.5 | 0.98 | 1.00 | 5 | 1 |
| | 5 | 2040 | 99.9 | 1.0 | 0.4 | 0.98 | 1.00 | 8 | 1 |
| | 6 | 1950 | 99.9 | 0.7 | 0.4 | 1.01 | 1.03 | 11 | 3 |
| | 7 | 1950 | 99.9 | 0.7 | 0.4 | 0.95 | 0.98 | 3 | 0.6 |
| | 8 | 1950 | 99.9 | 0.7 | 0.4 | 0.94 | 0.97 | 4 | 0.7 |
| | 9 | 1950 | 99.9 | 0.7 | 0.4 | 0.93 | 0.94 | 7 | 2 |
| Comp. Ex. | 1 | Commercial BZ50 | | 2.3 | 0.9 | — | 1.03 | 73 | 8 |
| | 2 | 2000 | 98.0 | 1.6 | 0.8 | 0.98 | 1.00 | 35 | 6 |
| | 3 | 2200 | 99.8 | 10.6 | 0.5 | 0.98 | 1.00 | 90 | 12 |
| | 4 | 1950 | 98.3 | 1.0 | 0.7 | 0.98 | 1.00 | 31 | 5 |

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A polycrystalline cubic boron nitride abrasive wherein a mean size of each primary crystal grain forming the abrasive is not more than 1.0 $\mu$m and a standard deviation thereof is not more than 0.5, said polycrystalline cubic boron nitride abrasive having a molar ratio of boron to nitrogen of not less than 0.95 and less than 1.00.

2. The polycrystalline cubic boron nitride abrasive according to claim 1 wherein said polycrystalline cubic boron nitride abrasive having said molar ratio of boron to nitrogen is prepared from low pressure phase boron nitride having a B/N molar ratio of not less than 0.900 and not more than 0.970.

* * * * *